United States Patent [19]
Cardwell

[11] 3,962,626
[45] June 8, 1976

[54] CURRENT DRIVEN INVERTER

[75] Inventor: Gilbert I. Cardwell, Los Angeles, Calif.

[73] Assignee: Hughes Aircraft Company, Culver City, Calif.

[22] Filed: Nov. 26, 1974

[21] Appl. No.: 519,974

[52] U.S. Cl. ............................................. 321/45 R
[51] Int. Cl.² .......................................... H02M 7/537
[58] Field of Search ............................. 321/18, 45 R; 331/113 A

[56] References Cited
UNITED STATES PATENTS

| | | | |
|---|---|---|---|
| 3,219,906 | 11/1965 | Keller et al. | 321/18 X |
| 3,308,370 | 3/1967 | Britten et al. | 321/45 R |
| 3,344,362 | 9/1967 | Lingle | 331/113 A X |
| 3,629,725 | 12/1971 | Ping Sun Chun | 331/113 A |

Primary Examiner—William M. Shoop
Attorney, Agent, or Firm—Fay I. Konzem; W. H. MacAllister

[57] ABSTRACT

An inverter circuit having drive transistors which are turned on by logic signal inputs, the drive transistors supply base current to output transistors, when these output transistors are turned on, current is permitted to flow through a current feedback transformer to supply regenerative base current to drive the output transistors into saturation. By using this current feedback technique, the efficiency of the inverter is greatly increased because no more base drive current is being delivered to the output transistors than is required. The inverter of the present invention also uses feedback loops from the base of the output transistors to the secondary of the current feedback transformer to sink the stored charge from the base emitter region of the output transistors so as to turn the transistors off rapidly.

3 Claims, 1 Drawing Figure

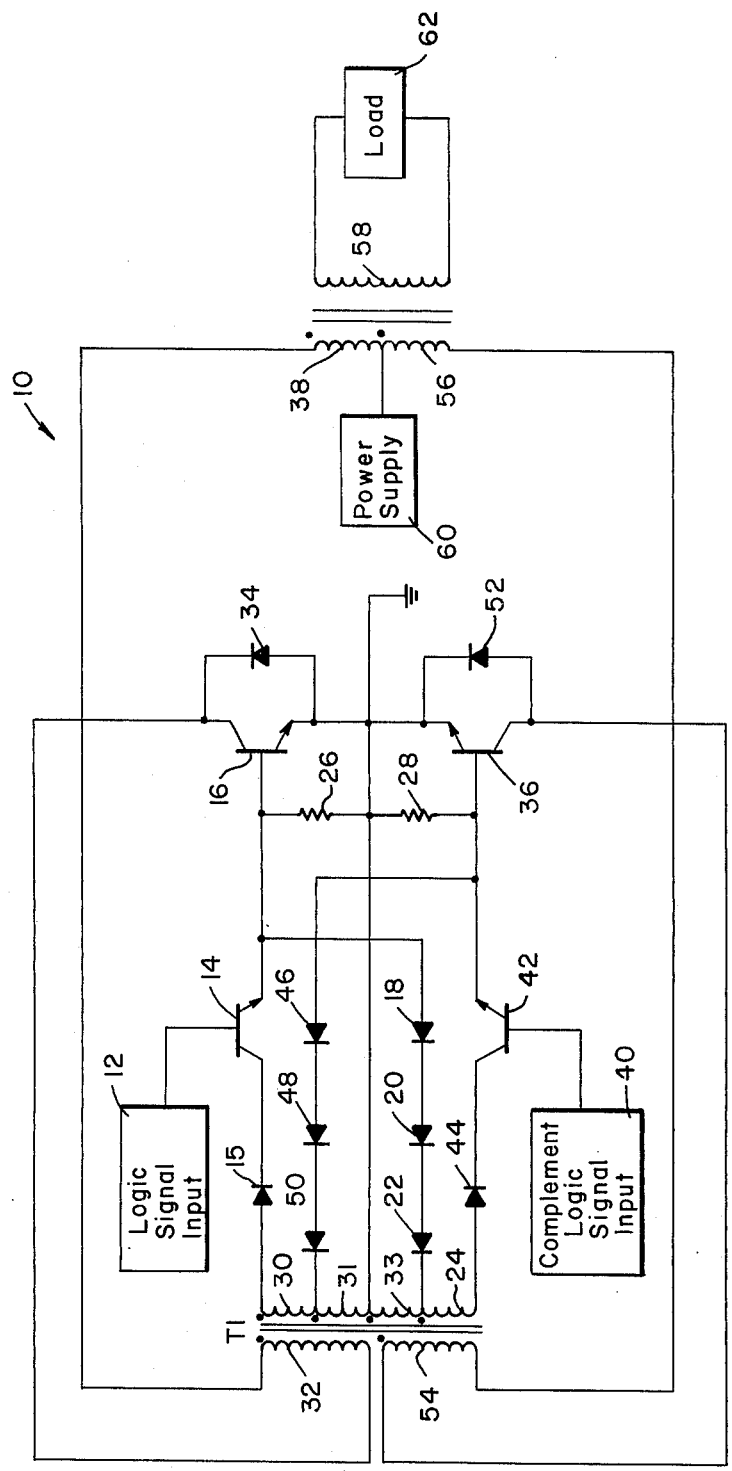

CURRENT DRIVEN INVERTER

BACKGROUND OF THE INVENTION

1. Field of the Invention

This invention relates to current inverters, and more particularly to a current inverter using regenerative current feedback to control the output transistors of the inverter.

2. Description of the Prior Art

In the art, inverters, which convert one DC voltage level to a higher DC voltage level have used current feedback to minimize drive losses and to produce a more efficient system. However, due to the positive feedback nature of the current feedback, these prior art systems are very often difficult to control and turn off.

The advantage of the present invention over the prior art inverters is that, the present invention uses current feedback to save power in driving the devices and thereby increases efficiency, also the present invention eliminates the difficulty of switching off the output transistors of the inverter by actively removing current from the base of the output transistors.

SUMMARY OF THE INVENTION

The inverter, in accordance with the invention, consists of logic signal inputs, drive transistors, whose emitters drive the base of the output transistors. When the output transistors are turned on, current is permitted to flow through a current feedback transformer and to thereby supply regenerative base current for driving the output transistors into saturation. Also feedback loops are connected between the emitters of the driving transistors and the secondary of the current feedback transformer to actively remove base current from the output transistors so that they can be rapidly switched off.

Accordingly, it is an object of this invention to provide an inverter circuit which uses regenerative current feedback to minimize drive losses and thereby to increase the efficient power switching in the inverter circuit.

Another object of this invention is to provide a feedback loop which actively removes stored charge from the base emitter junction of the output transistor to enable the transistor to be quickly shut off.

The features of the present invention which are believed to be novel are set forth with particularity in the appended claims. The present invention, both as to its organization and manner of operation, together with further objects and advantages thereof, may be better understood by reference to the following description, taken in connection with the accompanying drawings.

BRIEF DESCRIPTION OF THE DRAWING

FIG. 1 is a schematic of the inverter of the present invention.

DETAILED DESCRIPTION OF THE DRAWING

Referring now to FIG. 1, inverter circuit 10 has a logic signal input 12, which delivers a logic signal to drive transistor 14. Logic signal input 12 consists of a square wave generator. The emitter of transistor 14 is connected to the base of output transistor 16 and to the anode of diode 18. The cathode of diode 18 is connected to the anode of diode 20, the cathode of diode 20 is connected to the anode of diode 22 and the cathode of diode 22 is connected to one end of winding 24 of the secondary of current feedback transformer T1. The emitter of transistor 14 is also connected through resistor 26 to resistor 28, to the center of the secondary of transformer T1 and to ground. The collector of transistor 14 is connected to the cathode of diode 15 and the anode of diode 18 is connected to one end of winding 30 of the secondary of transformer T1.

The collector of output transistor 16 is connected to one end of the winding 32 of the primary of transformer T1 and to the cathode of diode 34. The emitter of output transistor 16 is connected to ground, to the anode of diode 34, and to the emitter of transistor 36. The other end of winding 32 of the primary of transformer T1 is connected to one end of winding 38 of the primary of transformer T2. The other end of winding 38 is connected to a positive power supply 60.

The other half of the inverter is connected similarly to the first half. A complement logic signal input 40 is inputed into drive transistor 42, the collector of transistor 42 is connected to the cathode of diode 44 and the anode of diode 44 being connected to one end of winding 24 of the secondary of transformer T1. The emitter of transistor 42 is connected to the anode of diode 46. The cathode of diode 46 is connected to the anode of diode 48, the cathode of 48 is connected to the anode of 50, and the cathode of 50 is connected to one end of winding 30 of the secondary of transformer T1. The emitter of transistor 42 is also connected to ground through resistor 28 and to the base of output transistor 36. The emitter of transistor 36 is connected to ground, to the emitter of transistor 16, to the center of the secondary of transformer T1, and to the anode of diode 52. The cathode of diode 52 is connected to the collector of transistor 36 and to one end of winding 54 of the primary of transformer T1. The other end of winding 54 is connected through winding 56 of the primary of transformer T2 to power supply 60. The secondary winding 58 of transformer T2 is connected to the output load 62.

CIRCUIT OPERATION

When a high logic signal is applied to the base of transistor 14, the transistor will turn on and will thereby cause current to flow into the base of output transistor 16. And the collector current of transistor 16 will cause current to flow through winding 32, which will couple winding 32 to windings 30 and 31. Consequently, the base drive to transistor 16 will also be increased. The current in the secondary of T1 flows through the on-transistor 14, reinforcing the base drive to transistor 16. In other words, the current flow through the feedback winding causes regenerative feedback current to be fed to the base of the output transistor 16. The base drive to transistor 16 is therefore proportional to the collector current by the turns ratio of transformer T1. The current through windings 30 and 31 of the feedback transformer T1 will increase until transistor 16 is saturated. When primary winding 32 begins to conduct current, current will flow through windings 38 and 56 of the primary of transformer T2, and the current over windings 38 and 56 is then coupled by transformer action to the secondary 58 of transformer T2. The positive voltage induced in the secondary winding of transformer T2 is applied to the load 62.

When transistor 16 is turned off, its current wants to flow the wrong way, so diode 34 is provided, so that the current of transistor 16 will not flow backwards. Diode 52 across transistor 36 is provided for the same reason.

The diode feedback loop consisting of diodes 18, 20, and 22, which is connected between the emitter of 14 and one end of the winding 24 of the secondary of T1 is used to actively remove current from the base of transistor 16, thereby removing stored charge from the base emitter region of transistor 16 and allowing the transistor to be turned off rapidly.

Complement logic signal input 40 is also a square wave generator like logic signal input 20 but input 40 is the complement or inverse of input 12. Therefore, when input 12 is a high logic level, input 40 is at a low level, and vice versa.

When logic input 12 delivers a low level pulse to transistor 14, the transistor is cut off, thereby also cutting off transistor 16. The feedback loop consisting of diodes 18, 20, and 22 permits those diodes to actively remove base current from the base-emitter region of transistor 16, causing transistor 16 to turn off rapidly.

The operation of the bottom half of the inverter is basically the same as the operation of the top half of the inverter. That is, when the signal from 12 is low and transistors 14 and 16 are turned off, the signal from input 40 will go high, turning drive transistor 42 on, which will turn on output transistor 36. Thereby causing current to flow through winding 54 of the primary of transformer T1, which will couple winding 54 to windings 24 and 33. The current in secondary windings 24 and 33 of T1 flows through on-transistor 42, reinforcing the base drive to transistor 36, until transistor 36 is saturated.

Also, when the signal from input 40 goes low, diodes 18, 20 and 22 actively remove base current from the base-emitter region of output transistor 36, causing transistor 36 to turn off rapidly.

The polarity of windings 24, 30, 31, 32, 33, 38, 54, 46 and 58, are indicated by dots adjacent to one end of each winding.

Although the device which has just been described appears to afford the greatest advantages for implementing the invention, it will be understood that various modifications can be made thereto without going beyond the scope of the invention, it being possible to replace certain elements by other elements capable of fulfilling the same technical function therein.

What is claimed is:

1. A current inverter utilizing current feedback to provide a more efficient inverter system and a feedback loop to remove base current from the output switching transistors of said inverter to provide faster switching comprising:
   a first and second output transistor for providing power from a source to a load whenever one of said output transistors are conducting;
   a logic signal input;
   a complementary logic signal input;
   a first and second drive transistor, said first drive transistor causes current to flow into the base of said first output transistor when a high binary signal is delivered by said logic signal input, and said second drive transistor causes current to flow into the base of said second output transistor when a high binary signal is delivered from said complementary logic signal input;
   said logic signal input provides a binary level signal to said first drive transistor to forward bias said transistor;
   said complementary logic signal input provides the inverse of said logic signal input's binary level signal to said second drive transistor;
   a current feedback transformer having a plurality of windings for providing regenerative feedback current to drive the bases of said output transistors through said drive transistors until said output transistors are saturated;
   first feedback means for removing base current from the base-emitter region of said first output transistor to rapidly turn off said transistor;
   second feedback means for removing base current from the base-emitter region of said second output transistor to rapidly turn off said transistor.

2. An inverter as recited in claim 1, further comprising:
   an inverter transformer for providing power from a power supply to a load;
   a power supply;
   a load;
   said inverter transformer having a plurality of primary windings and a secondary winding connected to said load;
   said current feedback transformer consists of a first and second primary winding, one end of said first windings is connected to the collector of said first output transistor, and the other end of said first winding is connected to one end of said first winding of said primary of said inverter transformer, one end of the second winding of the primary of said current feedback transformer is connected to the collector of said second output transistor, the other end of said transformer winding is connected to one end of said second winding of the primary of said inverter transformer, the other ends of the first and second windings of the primary of said inverter transformer are connected to each other and to said power supply.

3. An inverter as recited in claim 1, wherein said feedback loops consist of a plurality of diodes connected in series, said first loop being connected between the emitter of said first drive transistor and one end of said secondary windings of said current feedback transformer for actively removing stored charge from the base-emitter region of said first output transistor to rapidly turn off said transistor,
   said second loop being connected to the emitter of said second drive transistor and one end of said secondary windings of said current feedback transformer for actively removing stored charge from the base-emitter region of said second output transistor to rapidly turn off said transistor.

* * * * *

UNITED STATES PATENT OFFICE
CERTIFICATE OF CORRECTION

Patent No. 3,962,626           Dated June 8, 1976

Inventor(s) Gilbert I. Cardwell

It is certified that error appears in the above-identified patent and that said Letters Patent are hereby corrected as shown below:

Column 2, line 7 "the anode of diode 18" should read --the anode of diode 15-- as per Rule 312 Amendment to the Commissioner of Patents dated March 23, 1976.

Signed and Sealed this

Seventh Day of September 1976

[SEAL]

Attest:

RUTH C. MASON
*Attesting Officer*

C. MARSHALL DANN
*Commissioner of Patents and Trademarks*